United States Patent
Kim

(10) Patent No.: US 10,210,033 B2
(45) Date of Patent: Feb. 19, 2019

(54) MANAGING COMPONENT ERRORS WITH A COMMON SOFTWARE SENSOR BASED DIAGNOSTIC METHOD

(71) Applicant: Oracle International Corporation, Redwood Shores, CA (US)

(72) Inventor: Hyon Kim, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 15/598,754

(22) Filed: May 18, 2017

(65) Prior Publication Data
US 2018/0336084 A1  Nov. 22, 2018

(51) Int. Cl.
G06F 11/00  (2006.01)
G06F 11/07  (2006.01)

(52) U.S. Cl.
CPC ........ *G06F 11/0775* (2013.01); *G06F 11/079* (2013.01); *G06F 11/0727* (2013.01); *G06F 11/0751* (2013.01); *G06F 11/0772* (2013.01); *G06F 11/0793* (2013.01)

(58) Field of Classification Search
CPC .............. G06F 11/0775; G06F 11/008; G06F 11/079; G06F 11/3409; G06F 11/3452; G06F 11/3604

USPC .......................................................... 714/37
See application file for complete search history.

(56) References Cited

U.S. PATENT DOCUMENTS

| 6,493,656 B1 * | 12/2002 | Houston | G06F 11/0727 702/187 |
| 2008/0148101 A1 * | 6/2008 | Thornley | G06F 11/27 714/30 |
| 2010/0014540 A1 * | 1/2010 | Brocke | H04L 47/10 370/431 |
| 2016/0261474 A1 * | 9/2016 | Raghavan | H04L 43/10 |

\* cited by examiner

*Primary Examiner* — Sarai E Butler
(74) *Attorney, Agent, or Firm* — Invoke

(57) ABSTRACT

Operations include addressing a component error. An error management system obtains a vendor-specific error code from a hardware storage expander. The vendor-specific error code corresponds to an error state of a hardware component. Based on a mapping between a vendor-specific error code and a common error code, the system converts the vendor-specific error code to a common error code. Next, the system executes a diagnostic process for determining an operation for handling any errors corresponding to the common error code. Based on the operation determined by the diagnostic process, the system determines a vendor-specific instruction code. The system transmits the vendor-specific instruction code to the hardware storage expander for addressing the error state of the hardware component of the hardware storage expander.

20 Claims, 4 Drawing Sheets

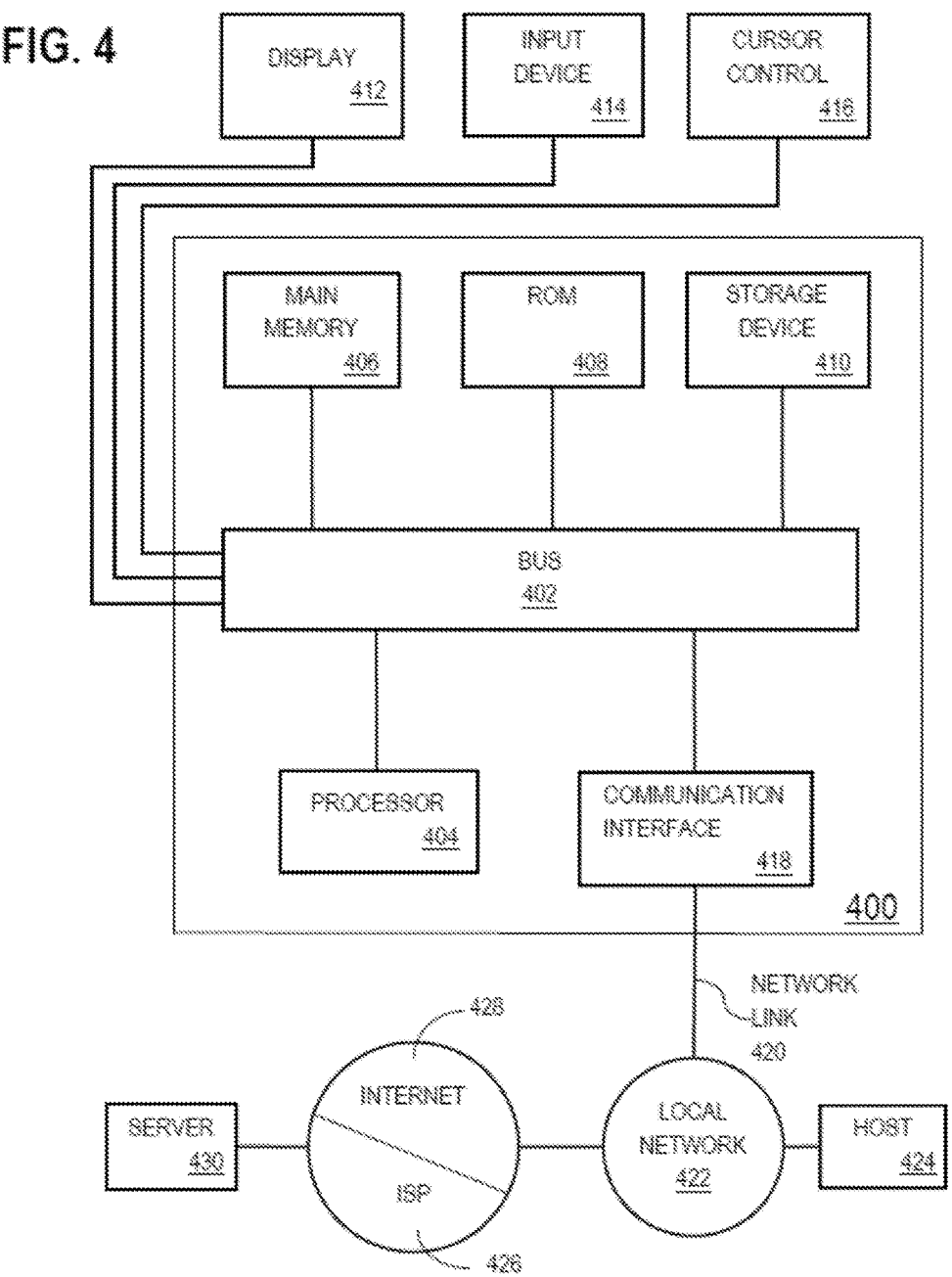

MANAGING COMPONENT ERRORS WITH A COMMON SOFTWARE SENSOR BASED DIAGNOSTIC METHOD

TECHNICAL FIELD

The present disclosure relates to error handling. In particular, the present disclosure relates to managing component errors with a common software sensor based diagnostic method.

BACKGROUND

A storage system includes many components. Components may include, for example, a disk drive, a controller, a power supply unit, and an expander. An expander can be used as a conduit to connect multiple components to a single input. For example, an expander may be used to connect one or more drives to a server.

A common type of a storage expander is a Serial Attached SCSI (SAS) expander. A SAS expander accommodates the connection of one or more storage devices operating under the SAS or Serial AT Attachment (SATA) protocols. A storage expander is typically installed into an enclosure, and may include components such as a controller, power supply unit, device slot, fan, electrically erasable programmable read-only memory (EEPROM), and/or bus. A naming standard may define codes for referencing components. Some components may be defined under a standard. For example, under the SCSI Enclosure Services (SES) standard, element codes include: 02h—power-supply, 04h—temperature-sensor, and 12h—voltage sensor. Some components may not be defined under a standard. For example, the T10 SES-3 standard does not define an electrically erasable programmable read-only memory (EEPROM) component, and a vendor assigns a private type that is within a vendor-defined range under the T10 specification.

A storage expander component may include one or more sensors. For example, a standard power supply has temperature, current, and voltage sensors. A sensor may be used to detect an error in a component. A component may experience a hardware and/or software error. For example, a component of an expander may overheat, or software running on a component of a expander may time out. Expander components made by different vendors may define different properties to report internal component errors. An expander component may report an internal component error along with a standard-defined component. Commonly, if multiple vendor components are reporting to a host, host diagnostics software may have to define a separate component resource to capture such errors and apply vendor-unique error handling and management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates a block diagram of a system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ERROR MANAGEMENT SYSTEM
3. MANAGING A COMPONENT ERROR
4. DETERMINING A COMMON INSTRUCTION CODE
5. EXAMPLE EMBODIMENTS
   A. VPD READ ERROR
   B. INTERNAL FIRMWARE FAILURE
6. MISCELLANEOUS; EXTENSIONS
7. HARDWARE OVERVIEW

1. General Overview

One or more embodiments include applying a uniform diagnostic method to handle errors across different vendor components. A vendor component, such as hardware or firmware, may generate an error code. Although some vendor components report errors using standard error codes, other components use vendor-specific error codes. By converting different vendor-specific error codes for a same kind of component error to a common error code, the system can use a uniform method to manage the same kind of component errors. The system may use a common software-defined discrete sensor to represent various internal error states of a vendor component. A benefit of using a common, software-defined discrete sensor is to represent various vendor component error states through a multi-state, software-defined sensor, and apply a common error-handling scheme.

In an embodiment, an error management system addresses a component error. The error management system obtains a vendor-specific error code from a hardware storage expander. The vendor-specific error code corresponds to an error state of a hardware component of a hardware storage expander. Based on a mapping between a vendor-specific error code and a commonly-applicable (common) error code, the system converts the vendor-specific error code to a common error code. Next, the system executes a diagnostic process for determining an operation for handling any errors corresponding to the common error code. Based on the operation determined by the diagnostic process, the system determines a vendor-specific instruction code. The system transmits the vendor-specific error-handling operation to the hardware storage expander for addressing the error state of the hardware component of the hardware storage expander.

2. Error Management System

Figure 1:
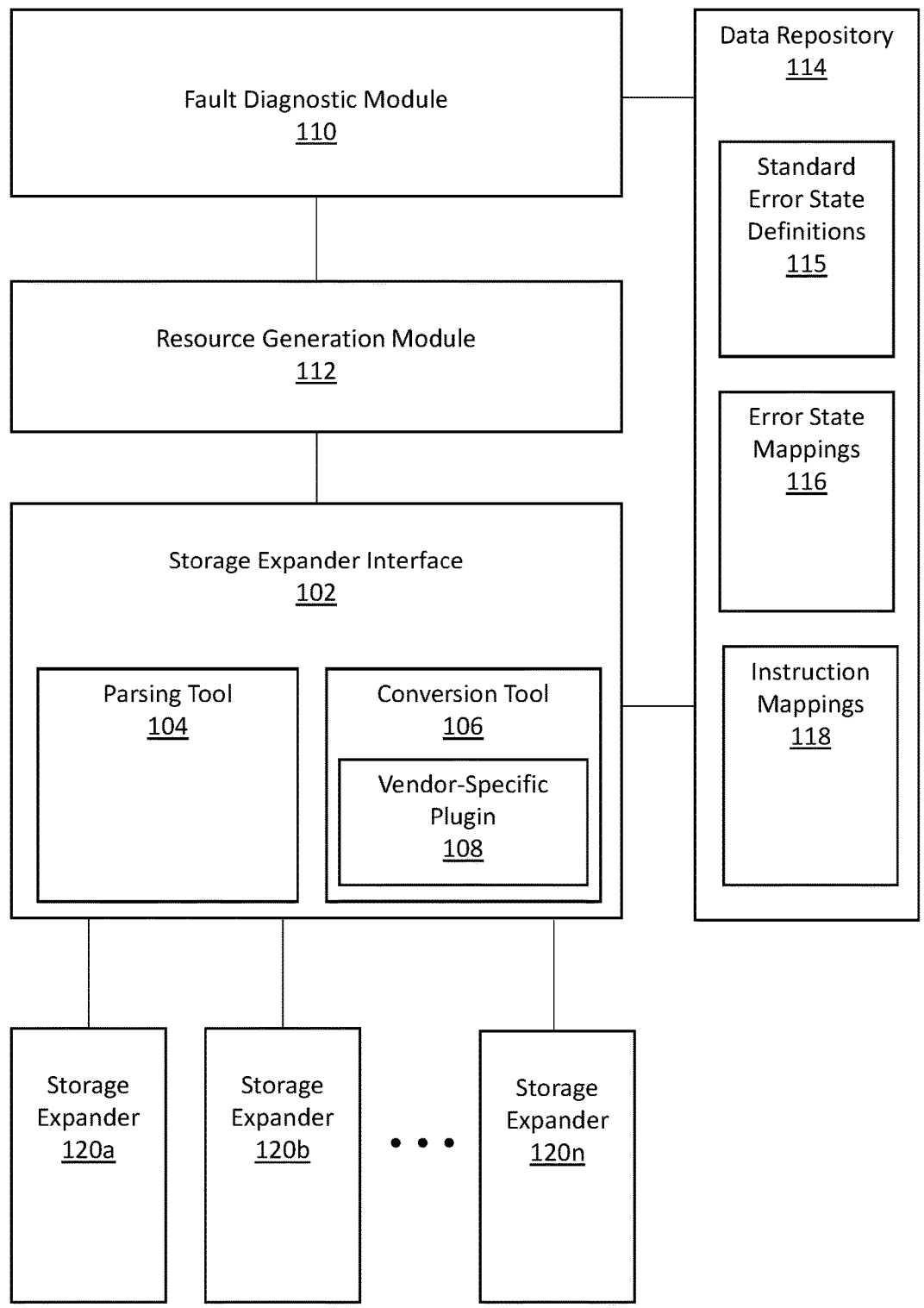
FIG. 1 illustrates an error management system in accordance with one or more embodiments.

FIG. 1 illustrates an error management system in accordance with one or more embodiments. A fault diagnostic module 110 applies a uniform rule to diagnose a component error. The system further includes a resource generation module 112, storage expander interface 102, data repository 114, and storage expanders 120a-120n. In one or more embodiments, the system may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, one or more storage expanders 120a-120n (also referred to herein as "hardware storage expanders" or "expanders") are included. A storage expander is a device that accommodates the connection of one more storage devices. A storage expander may include one or more connectors to accommodate the connection of one or more devices. An example of a storage expander is a Serial Attached SCSI (SAS) expander. A storage expander may include one or more hardware components (also referred to as "components") such as an enclosure chassis midplane, input/output (I/O) controller module, power supply unit, device slot, fan, EEPROM, internal bus, and/or firmware that operates across hardware components. Any component (a hardware component or a firmware module) of a storage expander may experience an error. For example, a component of a storage expander may experience an EEPROM read failure or a firmware module error (e.g., a watchdog timeout reset or a software assert).

Storage expanders 120a-120n may include functionality to transmit a message comprising a signal to the storage expander interface. The signal may be a hardware signal, or internal error flag, transmitted by a storage expander. A signal transmitted by a hardware storage expander may include an error code. An error code transmitted by a hardware storage expander may be a vendor-specific error code or a standard error code.

A standard error code is an error code of a well-known component, for which an industry-defined standard exists. For example, the SES-2 standard uses the following element status codes:

| Code | Name | Condition |
|------|------|-----------|
| 0h | Unsupported | Status detection is not implemented for this element. |
| 1h | OK | Element is installed and no error conditions are known. |
| 2h | Critical | Critical condition is detected. |
| 3h | Noncritical | Noncritical condition is detected. |
| 4h | Unrecoverable | Unrecoverable condition is detected. |
| 5h | Non Installed | Element is not installed in enclosure. |
| 6h | Unknown | Sensor has failed or element status is not available. |
| 7h | Not Available | Element installed, no known errors, but the element has not been turned on or set into operation. |
| 8h | No Access Allowed | The initiator port from which the RECEIVE DIAGNOSTIC RESULT command was received does not have access to this element. |
| 9h-Fh | Reserved | |

A standard error code may be linked to a standard internal component of a hardware storage expander. For example, SES-2 temperature sensor status codes are shown in the table below.

| Byte\Bit | 7 | 6 | 5 | 4 | 3 | 2 | 1 | 0 |
|----------|---|---|---|---|---|---|---|---|
| 0 | | | | | COMMON STATUS | | | |
| 1 | IDENT | FAIL | | | | Reserved | | |
| 2 | | | | | TEMPERATURE | | | |
| 3 | | Reserved | | | OT FAILURE | OT WARNING | UT FAILURE | UT WARNING |

A vendor-specific error code may be an error code generated by an internal component of a hardware storage expander, which is not defined under a standard. A vendor of a component or subsystem of a hardware storage expander may use its own scheme for defining an error state, which is different from any standard-defined error state. For example, an EEPROM to store vital product data is not a standard-defined element under the SES standard. Error states of EEPROMs are reported in a vendor-specific fashion which varies across different storage expander vendors.

In an embodiment, the data repository 114 is any type of storage unit and/or device (e.g., a file system, database, collection of tables, or any other storage mechanism) for storing data. Further, the data repository 114 may include multiple different storage units and/or devices. The multiple different storage units and/or devices may or may not be of the same type or located at the same physical site. The data repository may store standard error state definitions 115, error state mappings 116, and instruction mappings 118. The data repository may store a topology, which is a record of the most recent status of all devices and components comprising the system.

In an embodiment, a standard error state definition 115 defines a standard error state. A standard error state is a standard, industry-defined error state. A standard error state definition 115 may include a standard error code, an associated sensor reading, and/or an error state corresponding to a respective error code.

In an embodiment, an error state mapping 116 maps vendor-specific error codes to common error codes. A common error code is an error code that may be commonly applied across different vendors. A common error code indicates whether an error has occurred in a component. A common error code may be an industry standard specification defined error code. Alternatively, if not defined in an industry standard, a common error code may be defined by the error management system. An error code may be an alphanumeric code and/or a descriptive error state. For example, the error code could be the status "element in failure," the alphanumeric code 12z, indicating "element in failure," or both.

The data repository 114 may store a plurality of mappings corresponding to different vendors. For example, the following mapping maps vendor X error codes to common error codes:

| Vendor X Error Code | | Common Error Code |
|---|---|---|
| 11 | EEPROM OK | 1 SENSOR_STATE_VPD_OKAY |
| 10 | Point of failure detected on EEPROM | 2 SENSOR_STATE_VPD_SPOF |
| 01 | Total failure detected on EEPROM | 3 SENSOR_STATE_VPD_FAIL |
| 00 | Failure to recover data on EEPROM | 4 SENSOR_STATE_VPD_RECOVERY_FAIL |

The mapping maps vendor X error codes on the left to common error codes on the right. While the Vendor X error codes are specific to Vendor X EEPROMs, the common error codes are for vital product data (VPD), which may be used commonly across different devices from different vendors. The mapping maps vendor X error code 11 (EEPROM OK) to the corresponding common error code 1 (SENSOR_STATE_VPD_OKAY). The mapping maps Vendor X error code 10 (point of failure detected on EEPROM) to the corresponding common error code 2 (SENSOR_STATE_VPD_SPOF). The mapping maps Vendor X error code 01 (total failure detected on EEPROM) to the corresponding common error code 3 (SENSOR_STATE_VPD_FAIL). The mapping maps Vendor X error code 00 (Failure to recover data on EEPROM) to the corresponding common error code 4 (SENSOR_STATE_VPD_RECOVERY_FAIL).

For a particular error code, a corresponding error-handling procedure may be defined. The error-handling procedure may include instructions for one or more corrective actions. Examples of corrective actions include restarting a component, shutting down a component, transmitting a notification to a user, and generating a log of component actions. An instruction is one or more steps to be used in error handling. Examples of instructions include: reset component; save logs; and (a) restart component, (b) wait 5 minutes, (c) if component times out, then shut down component.

In an embodiment, an instruction mapping 118 maps a common instruction code to a vendor-specific instruction code. The instruction mapping may include instructions to convert the syntax of an operation to a syntax understandable by a particular vendor-specific hardware component. The instruction mapping may include additional or modified instructions to satisfy the requirements of a particular vendor-specific hardware component.

In one or more embodiments, the storage expander interface 102 includes hardware and/or software configured to communicate with a storage expander. The storage expander interface may include functionality to receive state information about one or more storage expanders. The storage expander interface may include a parsing tool 104, a conversion tool 106, and a vendor-specific plugin 108.

In one or more embodiments, the parsing tool 104 may include functionality to parse a message received from a storage expander. By parsing the message, the parsing tool may identify the different portions of the message including, but not limited to, error codes and component codes. As an example, the parsing tool may determine a type of message based on the first x bits of the message. If the message is of an error type, the parsing tool may determine that the next y bits in the message correspond to an error code. The y bits may be converted to a hexadecimal value corresponding to an error code.

In an embodiment, the conversion tool 106 includes functionality to analyze a received error code to determine whether conversion is needed. The conversion tool may include functionality to identify whether a received error code is a standard error code, or a vendor-specific error code that requires conversion. Determining whether the error code is a standard error code may include comparing the error code to known standard error codes. Determining whether the error code is a vendor-specific error code may include determining that the error code is not a standard error code. The conversion tool may compare the received error code to standard error state definitions 115, to determine whether the received error code is a standard error code.

In an embodiment, the conversion tool 106 includes functionality to convert a vendor-specific error code to a common error code. The conversion tool 106 may include functionality to access a mapping between common error state definitions and vendor-specific error state definitions. The conversion tool 106 may include one or more vendor-specific plugins, corresponding to one or more corresponding vendors.

In an embodiment, a vendor-specific plugin 108 includes hardware and/or software configured to convert a vendor-specific error code to a common error code. The vendor-specific plugin 108 may further include hardware and/or software configured to convert a vendor-specific instruction code to a common instruction code. The vendor-specific plugin 108 may include an error code used by a particular product made by a particular vendor. The vendor-specific plugin may include one or more mappings between a vendor-specific error code and a common error code. The vendor-specific plugin may include one or more mappings between a vendor-specific instruction code and a common instruction code.

In one or more embodiments, the resource generation module 112 includes functionality to create and update a resource sensor definition (also referred to herein as a sensor definition). A software-defined sensor indicates the state of some private component via the resource sensor definition. The software-defined sensor may be a multi-state software-defined discrete sensor, which represents multiple error states of a vendor-specific hardware component. The software-defined sensor may be subordinate to a standard-defined component. The resource sensor definition may be associated with a vendor-specific component error. The resource sensor definition may report the state of a vendor-specific hardware component per a common error state definition. The resource sensor definition may be generic, to capture possible error states over different vendor components and allow common operations to handle errors over different vendor components.

In an embodiment, the fault diagnostic module 110 includes hardware and/or software configured to apply a uniform rule to diagnose a component error of a storage expander across different vendor expanders. The fault diagnostic module may include functionality to map a common error code to a common instruction code. A common instruction code may correspond to a corrective action. The fault diagnostic module 110 may include functionality to transmit the common instruction code to the host resource generation module and/or to the storage expander interface.

3. Managing a Component Error

Figure 2:
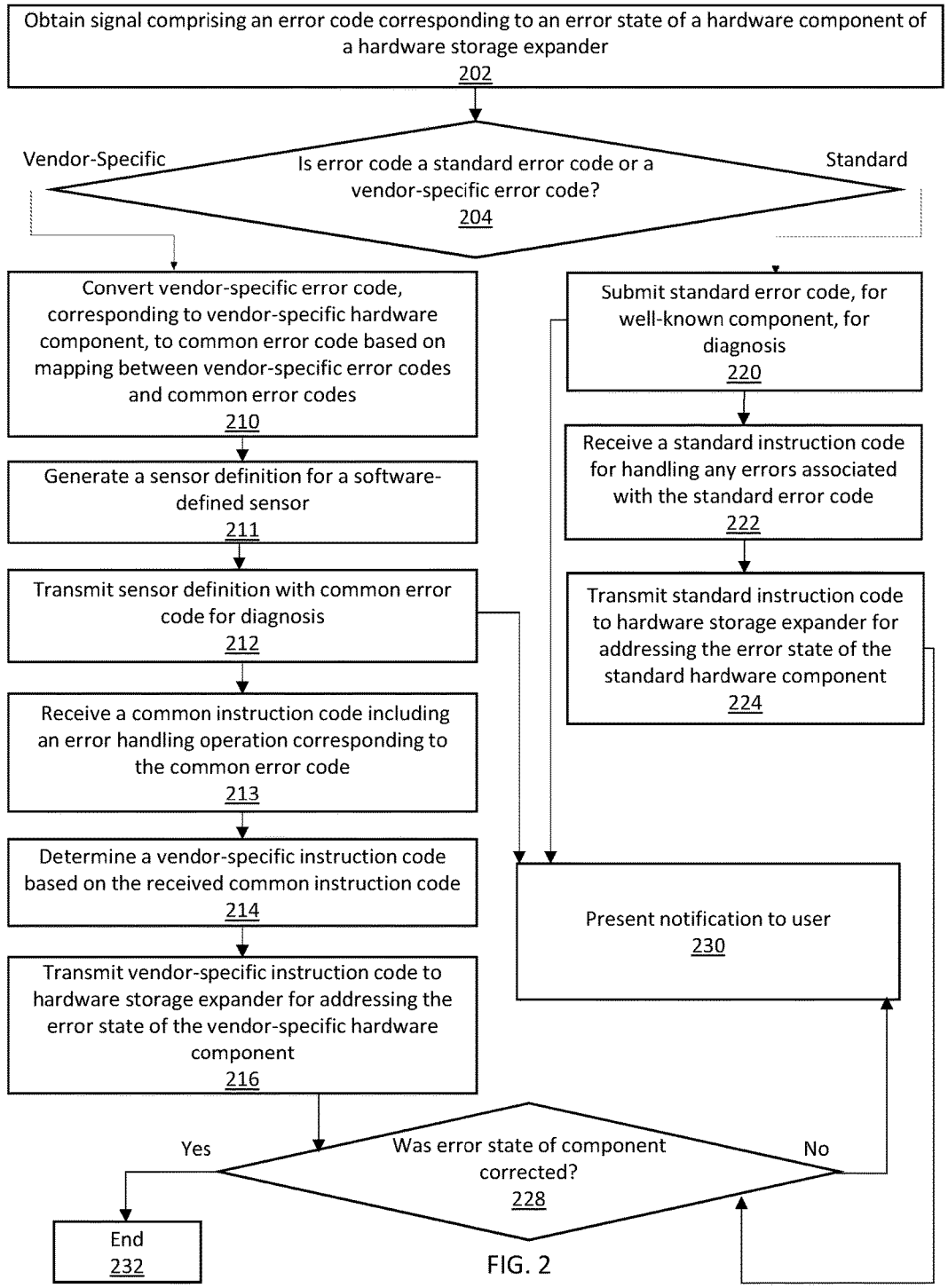
FIG. 2 illustrates an example set of operations for managing a component error in accordance with one or more embodiments.

FIG. 2 illustrates an example set of operations for managing a component error, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the storage expander interface obtains a signal comprising an error code corresponding to an error state of a hardware component of a hardware storage expander (Operation 202). The received error code may be received from an internal component of a hardware storage expander. A hardware component of a hardware storage expander may transmit an error code to report an error state of the hardware component.

The storage expander interface may obtain one or more signals, from one or more hardware storage expanders. The storage expander interface may receive two or more signals in a single message from a hardware storage expander, or in separate messages. Alternatively or additionally, the storage expander interface may obtain a signal from a monitoring device separate from a hardware storage expander. The storage expander interface may execute SCSI operations to read received diagnostics.

In an embodiment, the storage expander interface determines whether the error code is a standard error code or a vendor-specific error code (Operation 204). The conversion tool of the storage expander interface may analyze the received error code, and compare the error code to standard error state definitions. If the received error code corresponds to a standard error state definition, then the conversion tool may determine that the received error code is a standard error code, and does not require conversion. If the received error code does not correspond to a standard error state definition, then the conversion tool may determine that the received error code is a vendor-specific error code requiring conversion.

If the error code is a vendor-specific error code, then the storage expander interface converts the vendor-specific error code, corresponding to a vendor-specific hardware component, to a common error code, based on a mapping between vendor-specific error codes and common error codes (Operation 210). The storage expander interface may convert the error code by executing a vendor-specific plugin. The vendor-specific plugin may convert a vendor-specific error code to a common error code based on the appropriate mapping. For example, upon receiving the error code 01 (Total failure detected on EEPROM A) from a Vendor X component, the storage expander interface uses a vendor-specific plugin for Vendor X to map the received, vendor-specific, error code to the corresponding common error code 3 (SENSOR_STATE_VPD_FAIL).

The system may map different vendor-specific error codes, received from different vendor products, to a same common error code. For example, the system includes redundant EEPROMs. If one of the redundant EEPROMs fails, then there is an EEPROM redundancy failure. Vendor X may report an EEPROM redundancy failure by transmitting the error code 10 for EEPROM A (Point of failure detected on EEPROM A), while transmitting the error code 11 for EEPROM B (EEPROM B OK). Vendor Y may report dual EEPROM failure differently, by reporting, from a private midplane element, "Dual EEPROM failure." In either case, the system maps the error code(s) to the common error code 2 (SENSOR_STATE_VPD_SPOF), indicating that a single point of failure has been detected on the redundant EEPROMs.

In an embodiment, the resource generation module generates a sensor definition for a software-defined sensor (Operation 211). The software-defined sensor indicates the state of a vendor-specific hardware component. The resource generation module may set a software-defined discrete sensor to an error state, based on the common error code. If a sensor definition has not previously been generated, then the resource generation module may create a discrete sensor definition corresponding to the state of a standard-defined hardware component. Alternatively, if a sensor definition has previously been generated under a standard-defined expander controller resource, then the existing sensor definition may be updated at Operation 211. The resource generation module may update the sensor state as the system processes vendor-specific error reporting.

The resource generation module may generate a common error signal based on the common error code corresponding to the received vendor-specific error code. For example, a storage expander may report an error state of a programmed EEPROM device having a vendor-unique implementation. Instead of defining another resource for an EEPROM device component and associated vendor-specific error state properties, the system represents the error through a software-defined discrete sensor definition. The discrete sensor definition reports the error in association with a standard-defined expander controller resource.

For example, a chassis of a storage expander sends a signal with an error code corresponding to the vendor-specific error state, "chassis fan temperature 133 degrees F." to the storage expander interface. The storage expander interface coverts the received error code to a common error code corresponding to the common error state, "chassis temperature over threshold" and transmits the signal to the resource generation module. The resource generation module generates a discrete signal with the state "chassis temperature over threshold," corresponding to a commonly applicable chassis component. Now, the host has a common signal with a common sensor definition that can be used for any chassis in excess of the threshold temperature.

In an embodiment, the resource generation module transmits the sensor definition with the common error code for diagnosis (Operation 212). The resource generation module may transmit the sensor definition with a common error code for diagnosis to the fault diagnostics module via a direct connection, such as a bus, or wirelessly, e.g. via internet connection.

Alternatively or additionally, the system may present a notification to a user (Operation 230). The system may transmit a notification to an administrator if administrator intervention is required. Some errors may be correctable via system firmware, while other errors may require intervention by a service person. For example, a component may be physically broken. A physically broken component cannot be repaired using firmware. Rather, a physically broken component must be replaced by a new component. In such a case, the system presents a notification to a user, to replace or repair the faulty component. Based on a received user preference, the system may transmit a notification to a user whenever a component of a hardware storage expander is experiencing an error.

In an embodiment, the storage expander interface receives a common instruction code including an error-handling operation corresponding to the common error code (Operation 213). The system transmits a sensor state, indicating some repair action. The storage expander interface may receive the common instruction code from the fault diagnostic module. The storage expander interface may receive the common instruction code subsequent to the fault diagnostic module executing the operations in FIG. 3.

In an embodiment, the storage expander interface determines a vendor-specific instruction code based on the received common instruction code (Operation 214). The storage expander interface may determine a vendor-specific instruction code based on a mapping between common instruction codes and vendor-specific instruction codes. For example, the received common instruction code, "a150," corresponds to an instruction to reboot the memory of a vendor X expander. Based on a vendor-specific plugin corresponding to the vendor X expander, the storage expander interface maps the received common instruction code to the corresponding vendor X instruction code, "00222."

In an embodiment, the storage expander interface transmits the vendor-specific instruction code to the hardware storage expander for addressing the error state of the hardware component (Operation 216). The storage expander interface may send down a corrective action understandable by the firmware of a vendor-specific component, causing the firmware to take a corrective action. The storage expander interface may transmit the vendor-specific instruction code physically via a wire or a bus, and/or wirelessly over the internet. The storage expander interface may transmit one vendor-specific instruction code at a time, or the storage expander interface may transmit multiple vendor-specific instruction codes in a block.

In an embodiment, the system determines whether the error state of the vendor-specific component was corrected (Operation 228). An attempt to repair a vendor-specific component may be successful, or an attempt to repair a vendor-specific component may fail. The system may determine whether repair was successful by checking a component for an updated error code, or by attempting to interact with a component to test the component.

If the error state of the vendor-specific component was not corrected, then the system may present a notification to a user (Operation 230). The system may notify a user of an error state, so that the user can take steps to correct the error state, as described above.

In an embodiment, if the error state of the vendor-specific component was corrected, then the operations end (Operation 232). The error state has been successfully corrected.

If the error code obtained is a standard error code, then the storage expander interface submits the standard error code, for a well-known component, for diagnosis (Operation 220). The storage expander interface may transmit the standard error code to the fault diagnostics module via a direct connection, such as a bus, or wirelessly, e.g. via internet connection.

Alternatively or additionally, the system may present a notification to a user (Operation 230, described above).

In an embodiment, the storage expander interface receives a standard instruction code for handling any errors associated with the standard error code (Operation 222). The storage expander interface may receive the standard instruction code for handling the errors from the fault diagnostic module, subsequent to the fault diagnostic module executing the operations in FIG. 3.

In an embodiment, the storage expander interface transmits the standard instruction code to the hardware storage expander for addressing the error state of the hardware component (Operation 224). The storage expander interface may transmit the standard instruction code physically via a wire or a bus, and/or wirelessly over the internet. The storage expander interface may transmit one standard instruction code at a time, or the storage expander interface may transmit multiple standard instruction codes in blocks.

In an embodiment, the system determines whether the error state of the well-known component was corrected (Operation 228). An attempt to repair a well-known component may be successful, or an attempt to repair a well-known component may fail. The system may determine whether repair was successful by checking a component for an updated error code, or by attempting to interact with a component to test the component.

If the error state of the well-known component was not corrected, then the system may present a notification to a user (Operation 230). The system may notify a user of an error state, so that the user can take steps to correct the error state, as described above.

In an embodiment, if the error state of the well-known component was corrected, then the operations end (Operation 232). The error state has been successfully corrected.

As an example, an error management system includes Expander A from Vendor X. Expander A reports an internal chassis VPD error with the vendor-specific error code 10, corresponding to the vendor-specific error status "requested recovery failure." Because the error code received is a vendor-specific error code, and not a standard error code, the error management system converts the vendor-specific error code to a common error code. The error management system uses the following vendor-specific plugin to map the vendor-specific error code to a common error code:

| Vendor X Error Code | Common Error Code |
| --- | --- |
| 00 Dual EEPROM Device Failure | 0z Complete Failure |
| 01 Redundancy Failure | 1z No Redundancy |
| 10 Requested Recovery Failure | 2z Data Recovery Failure |
| 11 Recovery Success | 3z Data Recovery Completed |

The mapping maps Vendor X error codes on the left to common error codes on the right. The mapping maps Vendor X error code 00 (Dual EEPROM Device Failure) to the corresponding common error code 0z (Complete Failure). The mapping maps Vendor X error code 01 (Redundancy Failure) to the corresponding common error code 1z (No Redundancy). The mapping maps Vendor X error code 10 (Requested Recovery Failure) to the corresponding common error code 2z (Data Recovery Failure). The mapping maps Vendor X error code 11 (Recovery Success) to the corresponding common error code 3z (Data Recovery Completed). The error management system uses this vendor-specific plugin to convert the received Vendor X error code, 10, to the respective common error code, 2z.

Next, the error management system updates the "VPD" discrete sensor definition, with its state set to "data recovery failure." The error management system diagnoses an error-handling procedure for the VPD error—attempt recovery again; if successful, report success; if not successful, generate alert. This error-handling procedure corresponds to the common instruction code "1001." Based on the common instruction code 1001, the error management system determines the corresponding vendor-specific instruction code, "560h." The error management system transmits "560h" to expander A for error handling.

4. Determining a Common Instruction Code

Figure 3:
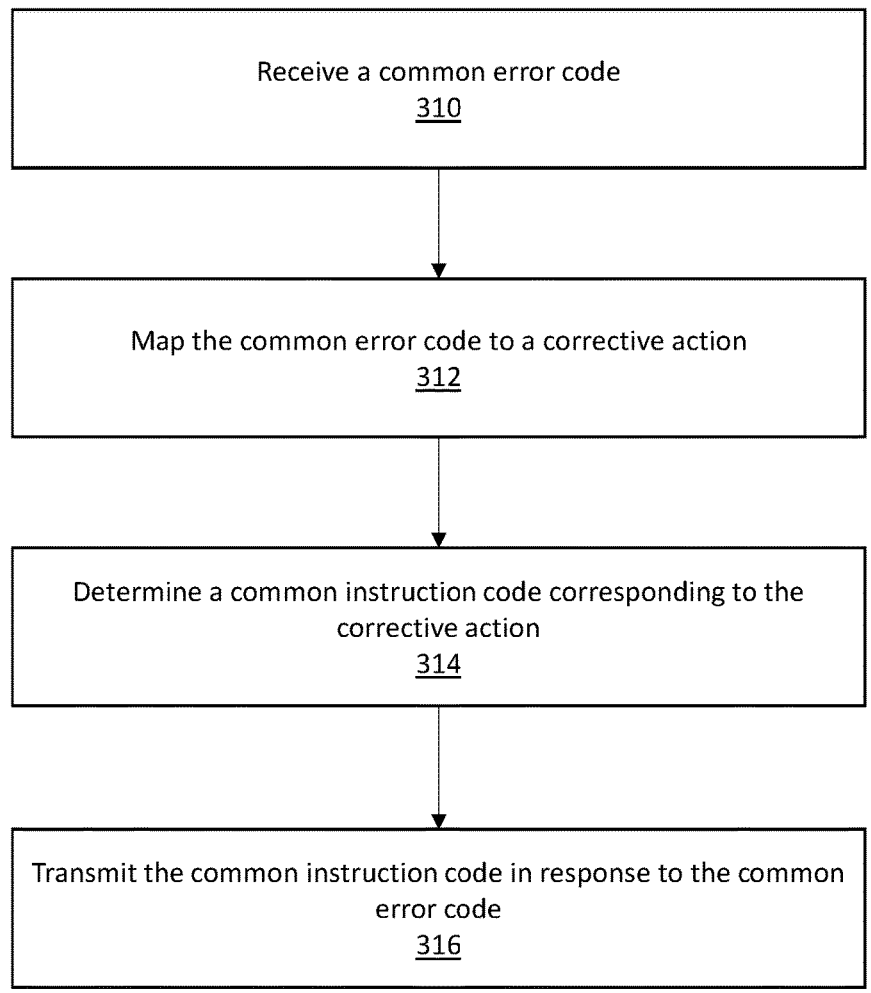
FIG. 3 illustrates an example set of operations for determining a common instruction code in accordance with one or more embodiments.

FIG. 3 illustrates an example set of operations for determining a common instruction code, in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an embodiment, the fault diagnostic module receives a common error code (Operation 310). The fault diagnostic module may receive the common error code from the resource generation module after Operation 212. Alternatively or additionally, the fault diagnostic module may receive a standard error code from the storage expander interface after Operation 220.

In an embodiment, the fault diagnostic module maps the common error code to a corrective action (Operation 312). The corrective action is an operation for handling any errors corresponding to the common error code. The fault diagnostic module may retrieve the appropriate corrective action using stored diagnostic information. The fault diagnostic module may use a table of error codes and corresponding corrective actions to determine the appropriate corrective action corresponding to a particular error code. The corrective action may comprise one step or a series of steps. For example, the fault diagnostic module may receive a common error code denoting that a component is nonresponsive. The fault diagnostic module uses a table to look up the received common error code. The table shows that the received common error code is associated with the "reboot" corrective action. The fault diagnostic module determines that the component should be rebooted.

In an embodiment, the fault diagnostic module determines a common instruction code corresponding to the corrective action (Operation 314). The fault diagnostic module may use stored diagnostic information to find the common instruction code corresponding to the selected corrective action. For example, the table described above may further include a column with a common instruction code. The fault diagnostic module determines that the corrective action "reboot" corresponds to the common instruction code "0123." The fault diagnostic may determine that an error code cannot be corrected automatically, in which case the fault diagnostic module may determine a notification to transmit to a user.

In an embodiment, the fault diagnostic module transmits the common instruction code in response to the common error code (Operation 316). The fault diagnostic module may transmit the common instruction code to the storage expander interface physically via a wire or a bus, and/or wirelessly over the internet.

5. Example Embodiments

A. VPD Read Error

As an example, the error management system is connected to two storage expanders: Expander A from Vendor X, and Expander B from Vendor Y. Expander A has two EEPROMs, each storing the same data. Expander B has two EEPROMs, each storing the same data. Because VPD data is vital, EEPROM redundancy is required. If one of the two EEPROMs fails, there is a redundancy error.

Expander A reports an internal chassis VPD read error through its private midplane element with the vendor-specific error code "EEPROM redundancy failure." Expander B reports an internal chassis VPD read error through its private EEPROM elements with two vendor specific error codes, "EEPROM 1 OK" and "EEPROM 2 Failure."

Both Expander A and Expander B are reporting what is, from the host perspective, the same redundancy failure. However, the two expanders report the failures from different components, and using different error codes. The host has two different incoming signals, corresponding to the same issue from two different storage expanders.

The storage expander interface consults plugins for Vendor A and Vendor B, respectively. Using vendor-specific plugins A and B, the storage expander interface maps each vendor-specific error code to a common error code. Using plugin A, the system maps the error code received from Expander A to the common error code, 1z ("no redundancy"). Using plugin B, the system maps the error codes received from Expander B to the same common error code, 1z. The system uses a single scheme to convert both received vendor-specific error codes to a single common error code.

The storage expander interface transmits the common error codes to the resource generation module. The system stores the most recent topology to the data repository. The new common error codes are used to update the VPD discrete sensor definition that the resource generation module generated on the error management system resource topology per the VPD discrete sensor definition. The VPD sensor definition is a software-defined sensor definition configured to handle the state of the vital product data. The discrete sensor definition is set to the common error state sent by the storage expander interface. The resource generation module transmits the discrete sensor definition to the fault diagnostic module. Instead of defining two resources, one for the expander B EEPROMs and associated vendor-specific error state properties, and one for the expander A midplane and associated vendor-specific error state properties, the host can represent the error states through a software-defined discrete sensor definition that reports each VPD data error in association with a standard-defined expander controller resource.

The fault diagnostic module diagnoses the VPD data error, using the same rule for both Expander A and Expander B. The system determines an appropriate action, based on the common error code. The appropriate action is to attempt to read the failed EEPROM again. If the EEPROM is still generating a read failure, copy the data from the functioning EEPROM to the nonfunctioning EEPROM, restoring redundancy. The corrective actions are mapped to a common instruction code, z78. In this case, the common instruction code is the same for both Expander A and Expander B.

Next, the system converts the common instruction code to vendor-specific instruction codes understandable by Expander A and Expander B, respectively. The system transmits the vendor-specific instructions to Expander A and Expander B.

During the recovery process, Expander A reports that Expander A is capable of recovering. The system continues recovering Expander A, and refreshes the topology when redundancy is restored to the EEPROMs of Expander A.

During the recovery process, Expander B reports that there was a failure, and redundancy cannot be restored by overwriting the faulty EEPROM. The error management system generates an alert, notifying a user to replace the faulty EEPROM of Expander B. Once Expander B recognizes that a user has replaced the faulty EEPROM, Expander B reports that redundancy has been restored. The system refreshes the topology to reflect that redundancy is restored for Expander B.

B. Internal Firmware Failure

As an example, the error management system includes storage Expander C from Vendor Z. Expander C reports a software error state as a post event notification through its EXPANDER STATE private element. Expander C has experienced a watchdog timeout. A software thread running on the expander is not responding. Expander C logs a "watchdog timeout" event with details on the nonresponsive thread or module after a certain interval. Expander C resets itself, and indicates that a watchdog timeout event occurred through its EXPANDER STATE private element definition.

The error management system detects that Expander C encountered a "watchdog timeout" by probing the EXPANDER STATE private element through a vendor-specific plugin for Expander C. The error management system updates the "expstate" discrete sensor for an associated expander controller host resource to a common firmware error state.

The fault diagnostic module generates instructions for an error-handling operation. The error-handling operation comprises the following instructions: collect the expander log that includes the state of the non-responsive thread or module; generate a host notification for analysis and clear the state of the expstate discrete sensor; and if the watchdog timeout occurs twice in a pre-determined interval, then keep the state of the discrete sensor and retire the component.

The error management system maps the instructions to a vendor-specific instruction code. The requirements of a particular vendor component may dictate that the instructions are altered. For example, vendor Z requires that, after two timeouts within ten minutes, it shuts off the component without intervention from the error management system after dumping the entire state of an expander to non-volatile media. The mapping used by the error management system reflects vendor Z's requirements. The error management system sets the expstate discrete sensor to an expander error state upon detecting such a state, and generates a notification for immediate analysis. The state of the expstate discrete sensor will be cleared when the error management system detects the disconnection of the shut-off expander.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   obtaining, from a first hardware storage expander, a first signal comprising a first vendor-specific error code corresponding to a first error state of a first hardware component of the first hardware storage expander, wherein the first vendor-specific error code corresponds to a first vendor of a plurality of vendors;
   based on a first mapping between (a) vendor-specific error codes corresponding to the first vendor and (b) common error codes: converting the vendor-specific error code to a particular common error code;
   executing a diagnostic process for determining an operation for handling any errors corresponding to the particular common error code;
   based on the operation determined by the diagnostic process, determining a first vendor-specific instruction code; and
   transmitting the first vendor-specific instruction code to the first hardware storage expander for addressing the first error state of the first hardware component of the first hardware storage expander.

2. The medium of claim 1, wherein the operations further comprise:
   obtaining, from a second hardware storage expander, a second signal comprising a second vendor-specific error code corresponding to a second error state of a second hardware component of the second hardware storage expander, wherein the second vendor-specific error code corresponds to a second vendor of the plurality of vendors;
   based on a second mapping between (a) vendor-specific error codes corresponding to the second vendor and (b) common error codes: converting the second vendor-specific error code to the same particular common error code converted from the first vendor-specific error code, wherein the first vendor-specific error code and the second vendor-specific error code are different error codes;

executing the diagnostic process for determining the operation for handling any errors corresponding to the particular common error code;

based on the operation determined by the diagnostic process, determining a second vendor-specific instruction code; and transmitting the second vendor-specific instruction code to the second hardware storage expander for addressing the second error state of the second hardware component of the second hardware storage expander.

3. The medium of claim 1, wherein obtaining the first signal comprises detecting a hardware signal transmitted by the first hardware storage expander.

4. The medium of claim 1, wherein the first hardware storage expander comprises a Serial Attached SCSI (SAS) expander.

5. The medium of claim 1, wherein converting the first vendor-specific error code to the particular common error code based on the first mapping comprises:

executing a vendor-specific plugin, corresponding to the first vendor, that converts the first vendor-specific error code to the particular common error code based on the first mapping.

6. The medium of claim 1, wherein the operations further comprise:

obtaining, from the first hardware storage expander, a second signal comprising a second common error code;

without performing any converting operation on the second common error code, executing the diagnostic process for determining a second operation for handling any errors corresponding to the second common error code; and transmitting, to the first hardware storage expander, instructions for execution of the second operation.

7. The medium of claim 6, wherein the first signal and the second signal are included in a same message received from the first hardware storage expander.

8. The medium of claim 1, wherein determining the first vendor-specific instruction code based on the operation determined by the diagnostic process is based on a second mapping between (a) common instruction codes and (b) vendor-specific instruction codes.

9. The medium of claim 1, wherein the operations further comprise:

receiving the particular common error code;
generating a resource sensor definition; and
transmitting the resource sensor definition, with the particular common error code, for execution of the diagnostic process.

10. A system comprising:
at least one device including a hardware processor;
the system configured to perform operations comprising:
obtaining, from a first hardware storage expander, a first signal comprising a first vendor-specific error code corresponding to a first error state of a first hardware component of the first hardware storage expander, wherein the first vendor-specific error code corresponds to a first vendor of a plurality of vendors;

based on a first mapping between (a) vendor-specific error codes corresponding to the first vendor and (b) common error codes: converting the vendor-specific error code to a particular common error code;

executing a diagnostic process for determining an operation for handling any errors corresponding to the particular common error code;

based on the operation determined by the diagnostic process, determining a first vendor-specific instruction code; and transmitting the first vendor-specific instruction code to the first hardware storage expander for addressing the first error state of the first hardware component of the first hardware storage expander.

11. The system of claim 10, wherein the operations further comprise:

obtaining, from a second hardware storage expander, a second signal comprising a second vendor-specific error code corresponding to a second error state of a second hardware component of the second hardware storage expander, wherein the second vendor-specific error code corresponds to a second vendor of the plurality of vendors;

based on a second mapping between (a) vendor-specific error codes corresponding to the second vendor and (b) common error codes: converting the second vendor-specific error code to the same particular common error code converted from the first vendor-specific error code, wherein the first vendor-specific error code and the second vendor-specific error code are different error codes;

executing the diagnostic process for determining the operation for handling any errors corresponding to the particular common error code;

based on the operation determined by the diagnostic process, determining a second vendor-specific instruction code; and transmitting the second vendor-specific instruction code to the second hardware storage expander for addressing the second error state of the second hardware component of the second hardware storage expander.

12. The system of claim 10, wherein obtaining the first signal comprises detecting a hardware signal transmitted by the first hardware storage expander.

13. The system of claim 10, wherein the first hardware storage expander comprises a Serial Attached SCSI (SAS) expander.

14. The system of claim 10, wherein converting the first vendor-specific error code to the particular common error code based on the first mapping comprises:

executing a vendor-specific plugin, corresponding to the first vendor, that converts the first vendor-specific error code to the particular common error code based on the first mapping.

15. The system of claim 10, wherein the operations further comprise:

receiving the particular common error code;
generating a resource sensor definition; and
transmitting the resource sensor definition, with the particular common error code, for execution of the diagnostic process.

16. A method comprising:
obtaining, from a first hardware storage expander, a first signal comprising a first vendor-specific error code corresponding to a first error state of a first hardware component of the first hardware storage expander, wherein the first vendor-specific error code corresponds to a first vendor of a plurality of vendors;

based on a first mapping between (a) vendor-specific error codes corresponding to the first vendor and (b) common error codes: converting the vendor-specific error code to a particular common error code;

executing a diagnostic process for determining an operation for handling any errors corresponding to the particular common error code;

based on the operation determined by the diagnostic process, determining a first vendor-specific instruction code; and transmitting the first vendor-specific instruction code to the first hardware storage expander for addressing the first error state of the first hardware component of the first hardware storage expander;

wherein the method is performed by at least one device including a hardware processor.

17. The method of claim 16, further comprising:

obtaining, from a second hardware storage expander, a second signal comprising a second vendor-specific error code corresponding to a second error state of a second hardware component of the second hardware storage expander, wherein the second vendor-specific error code corresponds to a second vendor of the plurality of vendors;

based on a second mapping between (a) vendor-specific error codes corresponding to the second vendor and (b) common error codes: converting the second vendor-specific error code to the same particular common error code converted from the first vendor-specific error code, wherein the first vendor-specific error code and the second vendor-specific error code are different error codes;

executing the diagnostic process for determining the operation for handling any errors corresponding to the particular common error code;

based on the operation determined by the diagnostic process, determining a second vendor-specific instruction code; and transmitting the second vendor-specific instruction code to the second hardware storage expander for addressing the second error state of the second hardware component of the second hardware storage expander.

18. The method of claim 16, wherein the first hardware storage expander comprises a Serial Attached SCSI (SAS) expander.

19. The method of claim 16, wherein converting the first vendor-specific error code to the particular common error code based on the first mapping comprises:

executing a vendor-specific plugin, corresponding to the first vendor, that converts the first vendor-specific error code to the particular common error code based on the first mapping.

20. The method of claim 16, further comprising:

receiving the particular common error code;

generating a resource sensor definition; and transmitting the resource sensor definition, with the particular common error code, for execution of the diagnostic process.

* * * * *